US012676818B2

(12) United States Patent
Bandekar et al.

(10) Patent No.: US 12,676,818 B2
(45) Date of Patent: Jul. 7, 2026

(54) LIMITING THE NUMBER OF SUBNET HOSTS LEARNED BY A NETWORK DEVICE IN A GIVEN TIME PERIOD

(71) Applicant: Arista Networks, Inc., Santa Clara, CA (US)

(72) Inventors: Vishal Bandekar, Bangalore (IN); Ramakrishnan Ganapathy Iyer, Bangalore (IN)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/400,623

(22) Filed: Dec. 29, 2023

(65) Prior Publication Data

US 2025/0219944 A1      Jul. 3, 2025

(51) Int. Cl.
*H04L 45/745*      (2022.01)
*H04L 45/42*      (2022.01)
*H04L 45/741*      (2022.01)

(52) U.S. Cl.
CPC ............ *H04L 45/745* (2013.01); *H04L 45/42* (2013.01); *H04L 45/741* (2013.01)

(58) Field of Classification Search
CPC ...... H04L 45/745; H04L 45/42; H04L 45/741
See application file for complete search history.

(56) References Cited

U.S. PATENT DOCUMENTS

| | | | |
|---|---|---|---|
| 10,938,819 B2 * | 3/2021 | Da Silva Peixoto | ........................ H04L 45/745 |
| 2002/0035681 A1 * | 3/2002 | Maturana | ............ H04L 63/0428 713/151 |
| 2010/0077471 A1 * | 3/2010 | Schleiss | ............. G05B 19/0428 726/13 |

FOREIGN PATENT DOCUMENTS

CN      1885799  A   * 12/2006

* cited by examiner

*Primary Examiner* — David R Lazaro
*Assistant Examiner* — Mariegeorges A Henry
(74) *Attorney, Agent, or Firm* — Tianyi He

(57)      ABSTRACT

Some disclosed examples involve receiving, by an application-specific integrated circuit (ASIC) of a network device, an indication that a maximum number of learned Internet Protocol (IP) hosts for a subnet has been reached for a given time interval. A "learned IP host" is an IP host for which a corresponding MAC address is known. Some disclosed examples involve receiving, by the ASIC and in a time interval during which the maximum number of learned IP hosts for the subnet has been reached, a packet having a destination IP address for an unlearned host on the subnet for which the corresponding MAC address is not known. Some disclosed examples involve dropping, by the ASIC, the received packet without involving the CPU of the device.

20 Claims, 7 Drawing Sheets

Before Host Limit Is Reached (IPv4 Example)

*After Host Limit Is Reached (Previous Method): CPU Involved with Processing of Unlearned Packets*

*After Host Limit Is Reached (Present Disclosure): Hardware Configured to Drop Unlearned Packets*

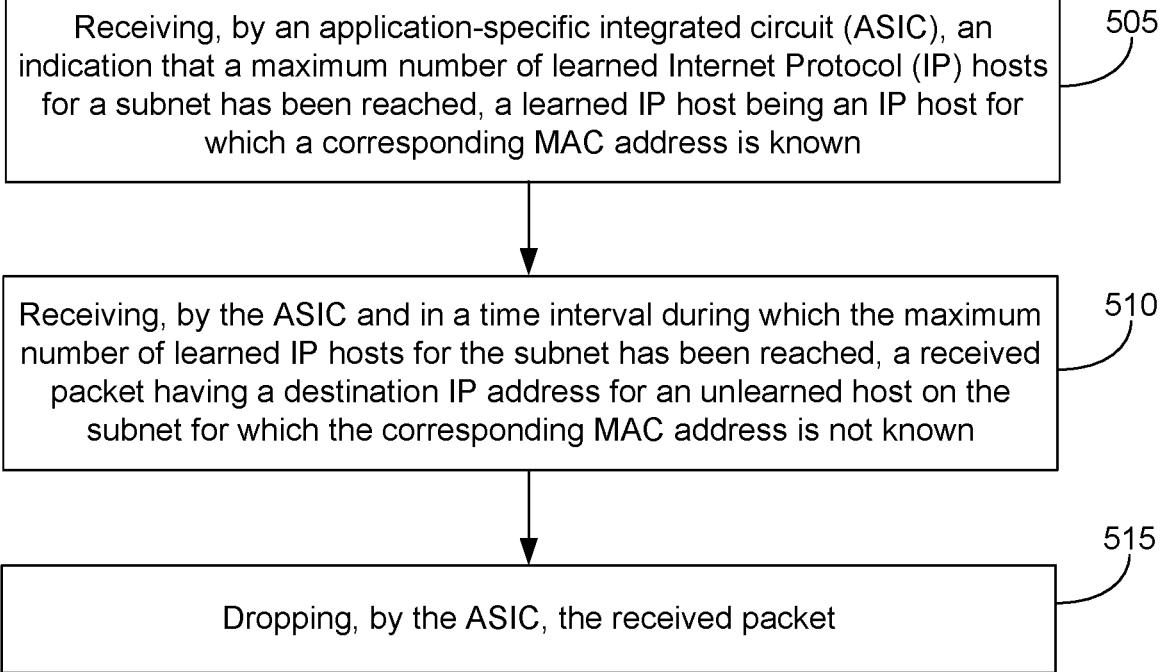

Receiving, by an application-specific integrated circuit (ASIC), an indication that a maximum number of learned Internet Protocol (IP) hosts for a subnet has been reached, a learned IP host being an IP host for which a corresponding MAC address is known

505

Receiving, by the ASIC and in a time interval during which the maximum number of learned IP hosts for the subnet has been reached, a received packet having a destination IP address for an unlearned host on the subnet for which the corresponding MAC address is not known

510

Dropping, by the ASIC, the received packet

Interface System

606

Control System

608

Memory System

LIMITING THE NUMBER OF SUBNET HOSTS LEARNED BY A NETWORK DEVICE IN A GIVEN TIME PERIOD

TECHNICAL FIELD

This disclosure relates to methods, devices and systems for restricting the number of hosts learned for each subnet by a network device, for example for each virtual local area network (VLAN).

BACKGROUND

Previously-deployed methods for enforcing the maximum number of hosts required involvement of the central processing unit (CPU) of a router. For example, suppose the maximum number of Internet Protocol version 4 (IPv4) hosts to be processed for a subnet has temporarily been reached. While the maximum number of hosts has been reached, if a packet is received by a router and the packet has a destination IP address for another device on the subnet for which the corresponding media access control (MAC) address has not been learned by the receiving router, previously-deployed methods would require the CPU of the receiving router to enforce the maximum number of IPv4 hosts for the subnet, for example by not sending an ARP request for the packet and causing the packet to be dropped. Improved methods would be desirable.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 5 is a flow diagram that presents examples of operations according to some disclosed methods.

DETAILED DESCRIPTION

Figure 1:
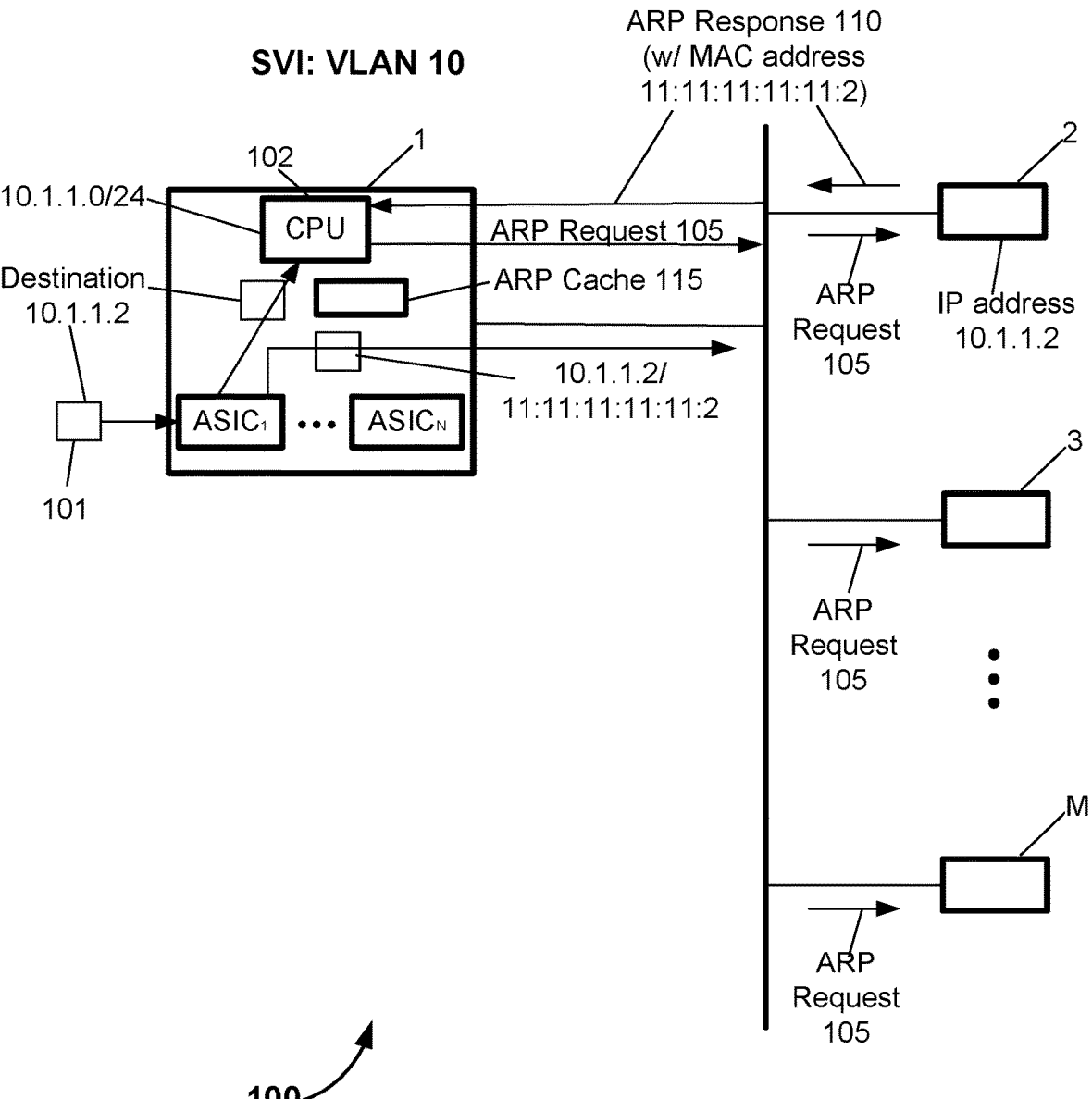
FIG. 1 shows an example of devices in a subnet performing an Address Resolution Protocol (ARP) process.

The following description is directed to certain implementations for the purposes of describing the innovative aspects of this disclosure. However, a person of ordinary skill in the art (POSITA) will readily recognize that the teachings herein may be applied in a multitude of different ways. Thus, the disclosed teachings are not intended to be limited to the implementations depicted solely in the Figures, but instead have wide applicability as will be readily apparent to a POSITA.

Administrators of a network device performing packet forwarding, such as a switch, router, and the like, often wish to restrict the number of Internet Protocol version 4 (IPv4) hosts and/or Internet Protocol version 6 (IPv6) hosts processed by the network device for each subnet, for example for each virtual local area network (VLAN), over a given period of time. Previously-disclosed methods for restricting the number of hosts processed for each subnet include setting and enforcing a maximum number of hosts. According to such methods, the number of hosts processed for each subnet will increase each time a new unknown host is added, until a maximum number of unknown hosts has been reached. In addition to setting a maximum number of hosts to be processed for each subnet, a time period over which the number of new hosts processed is associated with each subnet is generally set for each host. Thus, the number of new hosts permitted to be processed for each subnet by the network device is limited for any given period of time. Accordingly, the current number of learned hosts for each subnet varies over time for the network device, with new hosts being learned up to a maximum number of hosts and previously-added hosts being removed after each previously-added host's time limit has been reached. Therefore, the maximum number of hosts will only be reached temporarily, until a previously-added host is removed after that previously-added host's time limit is reached.

Previously-deployed methods for enforcing the maximum number of hosts required involvement of the central processing unit (CPU) of a router. For example, suppose the maximum number of Internet Protocol version 4 (IPv4) hosts for a subnet has temporarily been reached. While the maximum number of hosts has been reached, if a packet is received by a router and the packet has a destination IP address for an "unlearned host"-in other words, another device on the subnet for which the corresponding media access control (MAC) address has not been learned by the receiving router-previously-deployed methods would require the CPU of the receiving router to enforce the maximum number of IPV4 hosts for the subnet, for example by not sending an Address Resolution Protocol (ARP) request for the packet and causing the packet to be dropped.

Methods are disclosed herein for enforcing the maximum number of learned hosts processed for a subnet without requiring involvement by the CPU of the receiving router. In some implementations, if an application-specific integrated circuit (ASIC) of a receiving router configured for packet forwarding receives a packet for an "unlearned host" after the maximum number of learned hosts for a subnet has temporarily been reached, the receiving ASIC will cause the packet to be dropped without forwarding the packet to the CPU. Such implementations have the potential advantage of consuming less power and requiring less computational overhead by the CPU. Moreover, such implementations have the potential advantage of reducing the negative impact of denial of service (DOS) attacks that involve flooding a router with a large number of packets having destination addresses within the subnet. Instead of requiring the CPU to process all of the incoming packets, the receiving ASIC may be configured to drop such packets with unknown destinations after the maximum number of learned hosts for a subnet has temporarily been reached.

FIG. 1 shows an example of devices in a subnet perform-
ing an Address Resolution Protocol (ARP) process. Accord-
ing to this example, the subnet 100 includes devices 1-M.
Here, device 1 is a packet forwarding network device, such
as a router, that includes a central processing unit (CPU),
application-specific integrated circuits (ASICs) 1-N and
memory for implanting an ARP cache 115. Devices 2-M
may be, or may include, host devices other than routers, such
as laptop computers, mobile devices, etc.

As with other disclosed examples, the numbers of ele-
ments, types of elements, arrangements of elements, etc., in
FIG. 1 are merely shown by way of example. Other
examples may include different numbers, types and/or
arrangements of elements. For example, some implementa-
tions of the device 1 may include a single ASIC. Moreover,
although the operations described with reference to FIG. 1
pertain to the ARP process of IPV4, IPv6 involves a similar
"neighbor discovery" process that is also used to learn MAC
addresses and bind them with IP addresses. The present
disclosure applies to IPv4 and to IPV6 implementations.

At the time depicted in FIG. 1, the maximum number of
hosts processed by device 1 for the subnet 100 for a given
time period has not been reached. In this example, the packet
101 has a destination IP address of 10.1.1.2, which is for a
host that is "unlearned" at the time represented by FIG. 1. A
received packet for an "unlearned" host is a received packet
having a destination IP address—in this example, an IP
address of 10.1.1.2—for a host on the subnet 100 for which
the corresponding MAC address is not known. In this
context, "not known" means that the MAC address corre-
sponding to the IP address 10.1.1.2 is not currently stored in
the ARP cache 115 or another such data structure. In some
instances, the MAC address corresponding to the IP address
10.1.1.2 may have previously been stored in the ARP cache
115, but that binding may have been deleted pursuant to a
time-out process, after that previously-added host's time
limit was reached.

In this example, the packet 101 is received by $ASIC_1$.
Because the received packet has a destination address of an
"unlearned" host, $ASIC_1$ forwards the packet 101 to the CPU
102 for implementation of an ARP procedure. According to
this example, $ASIC_1$ forwards the packet 101, a copy of the
packet 101 or information regarding the packet 101 to the
CPU 102 by implementing what may be referred to herein
as a "catch-all route" or an "ARP trap": here, $ASIC_1$
forwards the packet 101, a copy of the packet 101 or
information regarding the packet 101 to the IP address
10.1.1.0, which corresponds to the CPU 102, for initiation of
an ARP procedure. Here, the IP route for the subnet 10.1.1.0/
24 corresponds to the catch-all route or ARP trap.

In response, the CPU 102 broadcasts the ARP request 105
corresponding to the IP address 10.1.1.2 to all other devices
on the subnet 100. According to this example, device 2 has
an IP address 10.1.1.2. Therefore, device 2—and only
device 2—sends an ARP response 110. Here, the ARP
response 110 indicates that the MAC address of device
2—which is 11:11:11:11:11:2 in this example—corresponds
with the IP address 10.1.1.2.

After receiving the ARP response 110, the CPU 102
updates the ARP cache 115 to indicate the "binding" of the
MAC address 11:11:11:11:11:2 and the IP address 10.1.1.2.
In some examples, a data entry corresponding to the "bind-
ing" of the MAC address 11:11:11:11:11:2 and the IP
address 10.1.1.2 may persist in the ARP cache 115 only
during a time limit, which may be on the order of a few
minutes, tens of minutes, an hour, multiple hours, etc., In
some examples, the time limit may be configurable according to user input. After the time limit, the data entry
corresponding to the MAC address and the IP address of
device 2 will be deleted from the ARP cache 115. Because
of the time limit for each learned host, the total number of
learned hosts for each subnet will decrease each time that an
existing learned host's time limit has been reached.

According to this example, $ASIC_1$ has access to the MAC
address/IP address bindings in the ARP cache 115. In the
example shown in FIG. 1, $ASIC_1$ is configured both for
receiving and transmitting packets. Therefore, in this
example $ASIC_1$ forwards the packet 101 to device 2. In some
alternative implementations, $ASIC_1$ may forward the packet
101 to another ASIC for transmission to device 2.

In addition to updating the ARP cache 115, in this
example device 1—for example, the CPU 102—also
updates the current number of learned IP hosts for the subnet
100 to include device 2. According to this example, the
number of hosts for the subnet 100 will increase each time
a new learned host is added, and decrease each time an
existing learned host has timed out, until a maximum
number of learned hosts has been reached for aa given time
period.

In some disclosed examples, there may be a maximum
number of learned IPv4 hosts and a separate maximum
number of learned IPv6 hosts. According to some examples,
the maximum number of learned IPv4 hosts and the maxi-
mum number of learned IPv6 hosts may be customer-
selectable. In some such examples, the maximum number of
learned IPv4 hosts may be different from the maximum
number of learned IPv6 hosts. For example, the maximum
number of learned IPv4 hosts may be set to 100 and the
maximum number of learned IPV6 hosts may be set to 200.
Accordingly, the maximum number of learned IPv4 hosts
may be attained during different time intervals, as compared
to the time intervals during which the maximum number of
learned IPv6 hosts is attained.

Figure 2:
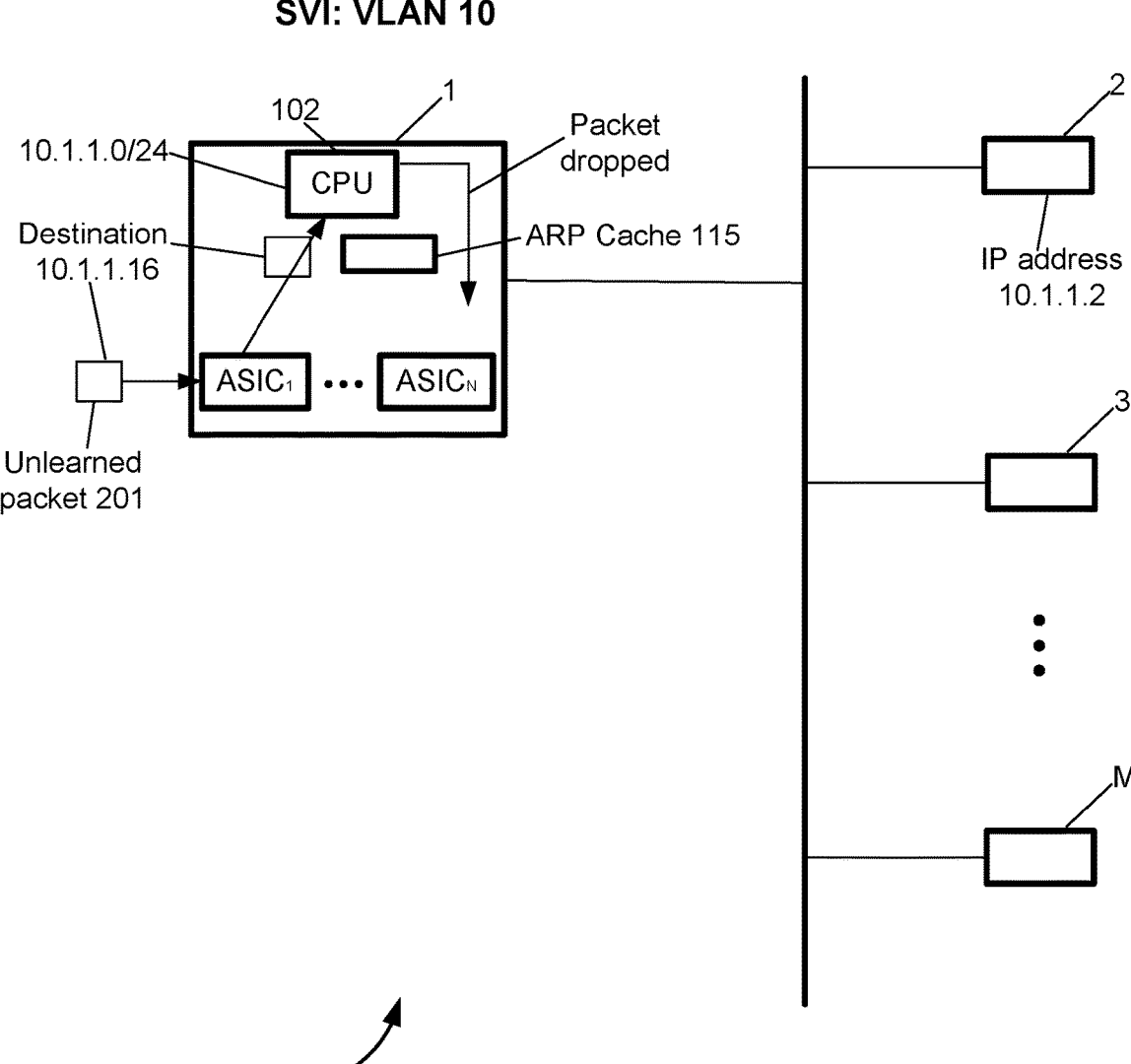
FIG. 2 shows an example of a previously-implemented method of enforcing a maximum number of learned IP hosts.

FIG. 2 shows an example of a previously-implemented
method of enforcing a maximum number of learned IP hosts.
The operations described with reference to FIG. 2 occur
during a time interval in which a maximum number of
learned IPv4 hosts, a maximum number of learned IPv6
hosts, or both, have been attained. In this example, $ASIC_1$ of
device 1 receives a packet 201 having a destination IP
address of 10.1.1.16, which corresponds to an unlearned
host in this example. In this example, the CPU 102 is
configured to enforce the maximum number of learned IP
hosts, via software executed by the CPU 102. Therefore,
$ASIC_1$ forwards the packet 201, a copy of the packet 201 or
information regarding the packet 201 to the IP route of the
subnet 10.1.1.0/24, which is a "catch-all route" correspond-
ing to the CPU 102.

The CPU 102 may enforce the maximum number of
learned IP hosts in various ways. In some IPv4-based
examples, the CPU 102 may enforce the maximum number
of learned IP hosts by not sending out an ARP request
corresponding to the packet 201, but instead dropping the
packet 201 (or causing the packet 201 to be dropped). In
other IPv4-based examples, the CPU 102 may enforce the
maximum number of learned IP hosts by sending out an
ARP request corresponding to the packet 201, but not
updating the ARP cache 115 responsive to an ARP response
and instead dropping the packet 201.

According to these previously-deployed methods, regard-
less of how the CPU 102 is configured to enforce the
maximum number of learned IP hosts, when packets
addressed to unlearned hosts are sent to the CPU 102,
hardware (in other words, ASIC) resources are consumed to send the packet to the CPU. Moreover, CPU resources—and in some instances, the resources of one or more other devices on the subnet 100—are consumed to process the trapped packet.

Moreover, such previously-deployed examples in which the CPU 102 is configured to enforce the maximum number of learned IP hosts make the device 1 relatively more vulnerable to denial of service (DOS) attacks. In DOS attacks, the device 1 may be bombarded with a large number of packets at a high rate, sometimes packets having random IP addresses. Like all CPUs, the CPU 102 has a finite capacity. If the CPU 102 is required to enforce the maximum number of learned IP hosts during a DOS attack, the CPU 102 may become overwhelmed and may not be able to process packets that are not involved with the DOS attack.

Figure 3:
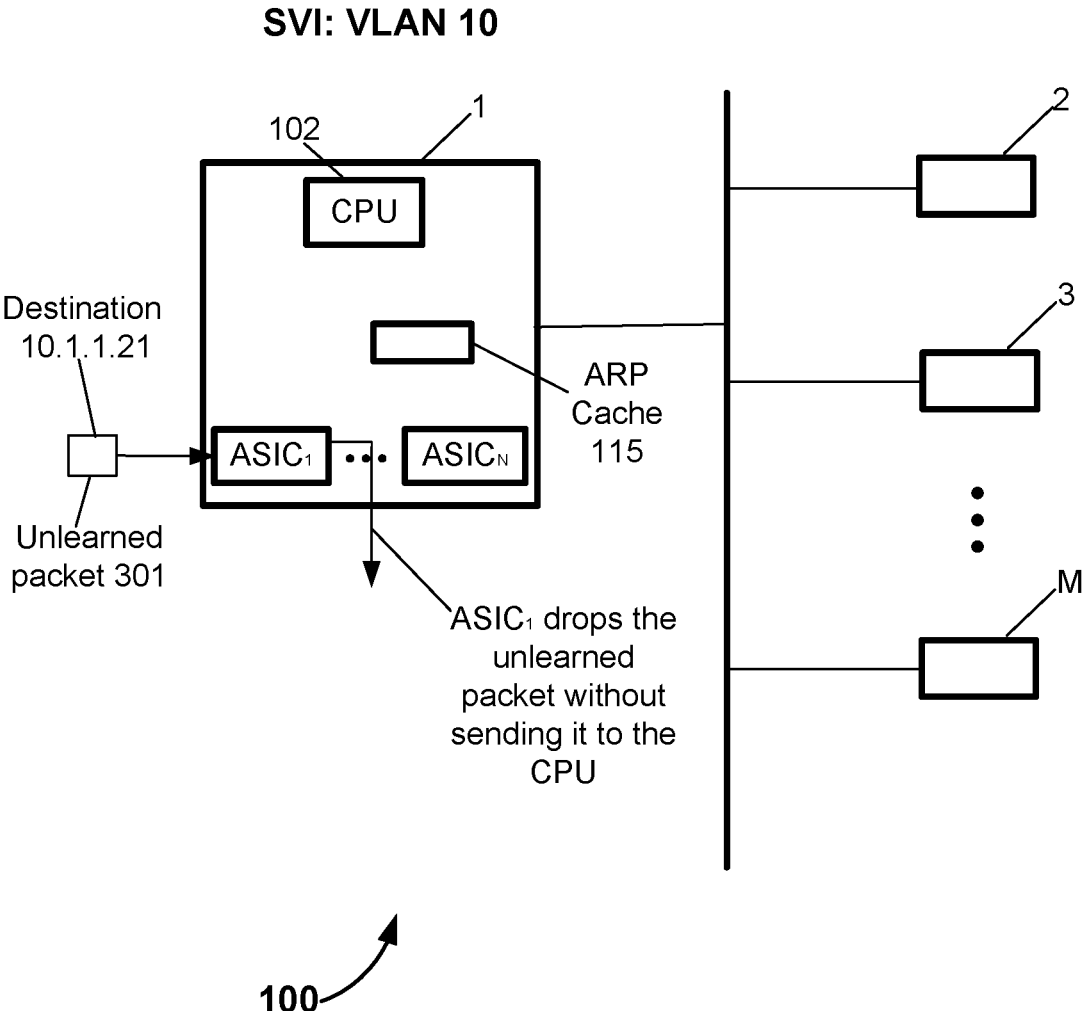
FIG. 3 shows an example of a method of enforcing a maximum number of learned IP hosts according to the present disclosure.

FIG. 3 shows an example of a method of enforcing a maximum number of learned IP hosts according to the present disclosure. The operations described with reference to FIG. 3 occur during a time interval in which a maximum number of learned IPv4 hosts, a maximum number of learned IPv6 hosts, or both, have been attained. In this example, $ASIC_1$ of device 1 receives a packet 301 having a destination IP address of 10.1.1.21, which corresponds to an unlearned host in this example. In this example, the hardware of device 1 is configured to enforce the maximum number of learned IP hosts. In this context, the term "hardware" refers to one or more ASICs of device 1. According to this example, $ASIC_1$ drops the packet 301 without sending the packet 301, a copy of the packet 301 or information regarding the packet 301 to the CPU 102.

Therefore, according to the presently-disclosed methods, hardware (in other words, ASIC) resources are not consumed to send the packet 301 to the CPU 102. Moreover, neither the resources of CPU 102 nor the resources of one or more other devices on the subnet 100 are consumed in processing the packet 301. In addition to being more efficient in terms of resource consumption, the presently-disclosed methods make the device 1 relatively more resilient to DoS attacks, because the CPU 102 would not be involved in processing packets addressed to unlearned IP hosts after the maximum number of learned IP hosts has been reached for a given time interval.

Figure 4A:
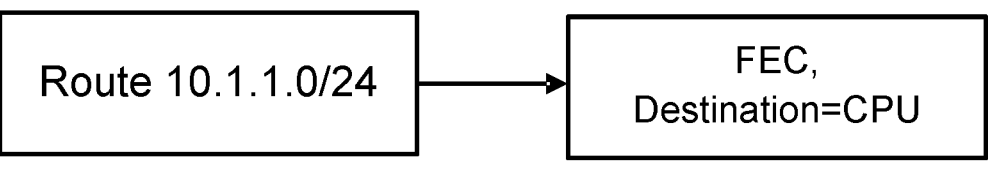
FIG. 4A shows examples of instructions that may be used to implement a previously-implemented method of enforcing a maximum number of learned IP hosts.

FIG. 4A shows examples of instructions that may be used to implement a previously-implemented method of enforcing a maximum number of learned IP hosts. These instructions may, for example, be encoded on, and implemented by, an ASIC of a device that receives a packet addressed to an unlearned host, such as $ASIC_1$ of device 1 of FIG. 2. In this example, when a maximum number of learned IP hosts has been reached, the instructions cause the ASIC to send the packet addressed to the unlearned host through a a forwarding equivalence class (FEC) pointed to by the IP route of the subnet address 10.1.1.0/24, which is a "catch-all route" corresponding to the CPU 102 of the receiving device 1. In this example, the CPU of the receiving device 1 is configured for enforcing the maximum number of learned IP hosts.

Figure 4B:
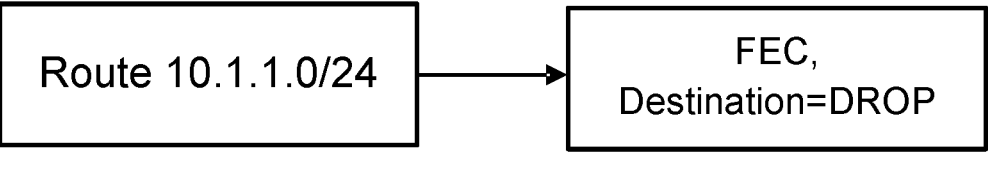
FIG. 4B shows examples of instructions that may be used to implement a currently-disclosed method of enforcing a maximum number of learned IP hosts.

FIG. 4B shows examples of instructions that may be used to implement a currently-disclosed method of enforcing a maximum number of learned IP hosts. As with the example shown in FIG. 4A, these instructions may be encoded on, and implemented by, an ASIC of a device that receives a packet addressed to an unlearned host, such as $ASIC_1$ of device 1. In this example, when a maximum number of learned IP hosts has been reached, the instructions cause the ASIC to drop the packet addressed to the unlearned host through forwarding equivalence class (FEC) pointed to by the IP route of the subnet address 10.1.1.0/24, for example as described with reference to FIG. 3. Here, instead of sending the packet addressed to the unlearned host to a CPU of the receiving device via an "catch-all route," as in the example of FIG. 4A, the instructions of FIG. 4B point to a DROP destination during time intervals in which the learned IP host route limit is reached. This example may be implemented simply by updating one line of hardware instructions to update the forwarding equivalence class (FEC) pointed to 57 by the catch-all route for the subnet to point to a Drop destination during time intervals in which the learned IP host route limit is reached. Accordingly, the change may involve simply updating one line of hardware instructions inline without disturbing the device's routing table.

FIG. 5 is a flow diagram that presents examples of operations according to some disclosed methods. The blocks of FIG. 5 may, for example, be performed by the apparatus of FIG. 3, FIG. 6 or FIG. 7, or by a similar apparatus. For example, in some implementations one or more ASICs of device 1 of FIG. 3, or of device 601 of FIG. 6 may be configured to perform, at least in part, the operations that are described herein with reference to FIG. 5. As with other methods disclosed herein, the methods outlined in FIG. 5 may include more or fewer blocks than indicated. Moreover, the blocks of methods disclosed herein are not necessarily performed in the order indicated. In some implementations, one or more blocks may be performed concurrently.

According to this example, block 505 involves receiving, by an ASIC, an indication that a maximum number of learned IP hosts for a subnet has been reached for a given time interval. In this example, a "learned IP host" is an IP host for which a corresponding MAC address is known. For example, a "learned IP host" may be an IP host for which a corresponding MAC address is currently stored in the ARP cache 115 of FIG. 3 or in a similar data structure.

In some examples, the maximum number of IP hosts may be specific to an IP version, such as IPv4 or IPv6. Receiving the indication in block 505 may, for example, involve determining that a maximum number of learned IPv4 hosts for a subnet has been reached and/or determining that a maximum number of learned IPv6 hosts for a subnet has been reached.

According to some examples, a CPU of the receiving apparatus may be configured to maintain a count of the current number of learned IP hosts and/or to determine whether the current number of learned IP hosts has reached the maximum value. Receiving the indication in block 505 may, for example, involve the ASIC receiving the indication from the CPU. In some instances, block 505 may involve the ASIC receiving the indication by querying a data structure indicating the current number of learned IP hosts, may involve the ASIC determining whether a flag has been set indicating that the current number of learned IP hosts has reached the maximum value, etc.

In this example, block 510 involves receiving, by the ASIC and in a time interval during which the maximum number of learned IP hosts for the subnet has been reached, a received packet having a destination IP address for an unlearned host on the subnet for which the corresponding MAC address is not known.

According to this example, block 515 involves dropping, by the ASIC, the received packet. For example, the ASIC may drop the received packet without sending the received packet to the CPU. According to some examples, the ASIC may drop the received packet without sending information regarding the received packet to the CPU.

In some instances, method 500 may involve receiving, by the ASIC, an indication that one or more additional IP hosts may be learned for the subnet. For example, method 500 may involve receiving, by the ASIC, an indication that one or more previously-learned hosts has "timed out" and therefore that the current number of learned IP hosts for the subnet is no longer the maximum number of learned IP hosts for the subnet. In some such examples, method 500 may involve receiving, by the ASIC, a packet having a destination IP address for an unlearned host on the subnet for which the corresponding MAC address is not known. In some such examples, method 500 may involve forwarding, by the ASIC, the packet to the CPU.

Figure 6:
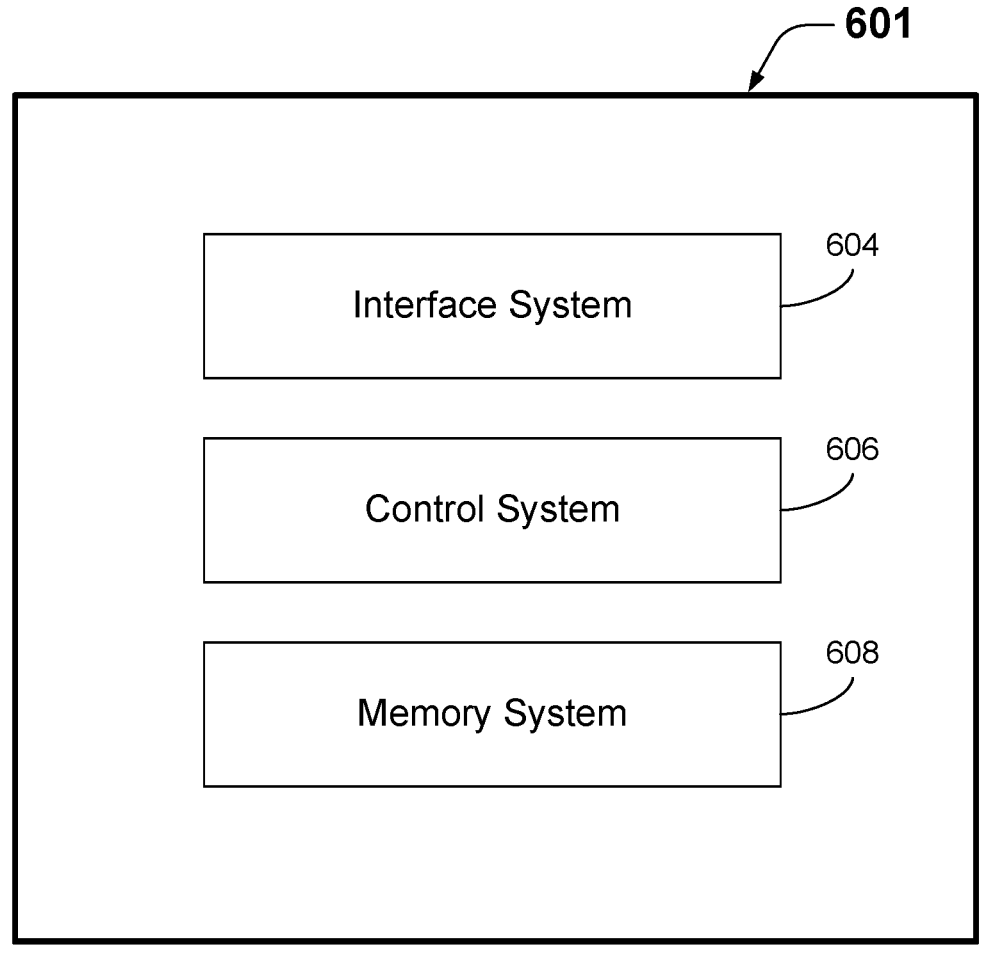
FIG. 6 is a block diagram that shows example components of an apparatus according to some disclosed implementations.

FIG. 6 is a block diagram that shows example components of an apparatus according to some disclosed implementations. In this example, the apparatus 601 includes an interface system 604, a control system 606 and a memory system 608. As with other disclosed examples, alternative implementations of the apparatus 601 may include different numbers of elements, different types of elements, or combinations thereof. In some implementations, the apparatus 601 may be a network device capable of forwarding packets, such as a router or a switch. Device 1 of FIG. 3 is one such example of the apparatus 601.

Figure 7:
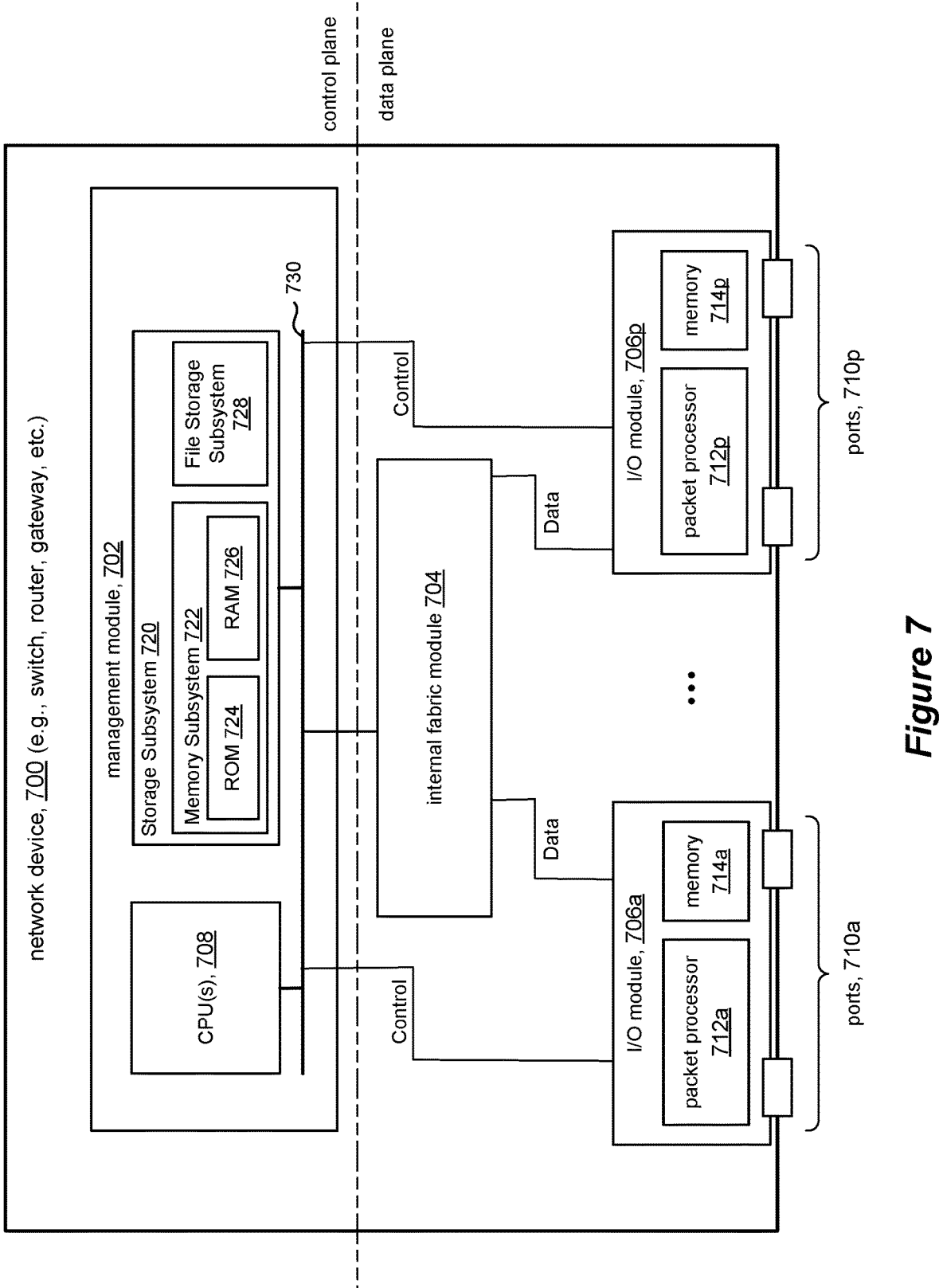
FIG. 7 is a schematic representation of a network device (e.g., switch, router, etc.) that can be adapted in accordance with the present disclosure.

In some implementations, the interface system 604 may include a plurality of network interfaces configured for communication between the control system 606 and the control systems of other network devices. According to some examples, the interface system 604 may be configured for receiving and transmitting packets. The interface system 604 may include internal communication pathways between components of the apparatus 601, including internal communication pathways between modules implemented by the control system 606. Internal fabric module 704, I/O modules 706*a*-706*p* and bus subsystem 730, which are described below with reference to FIG. 7, provide examples of such internal communication pathways. Accordingly, the interface system 604 may include one or more interfaces between the control system 606 and the memory system 608, for example via electrically conducting material (e.g., via electrically conductive metal wires or traces).

The control system 606 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The CPU 102 and the ASICs shown in FIG. 3 are example components of the control system 606. Although the control system 606 and the memory system 608 are shown as separate blocks in FIG. 6, according to some examples the control system 606 also may include one or more memory devices, such as one or more random access memory (RAM) devices, one or more read-only memory (ROM) devices, etc. Accordingly, both the control system 606 and also the memory system 608 may include such components.

According to some examples, the control system 606 may include one or more ASICs configured to receive an indication that a maximum number of learned IP hosts for a subnet that includes the apparatus 601 for a given time interval has been reached. A learned IP host is an IP host for which a corresponding MAC address is known. In some examples, the indication may be received from a CPU of the apparatus 601. The CPU may be an element of the control system 606. According to some examples, the maximum number of IP hosts may be specific to an IP version, such as IPv4 or IPv6.

The one or more ASICs may be configured to receive, via the interface system 604 and during a time interval during which the maximum number of learned IP hosts for the subnet has been reached, a received packet having a destination IP address for an unlearned host on the subnet for which the corresponding MAC address is not known. The one or more ASICs may be configured to drop the received packet. For example, the one or more ASICs may be configured to drop the received packet without sending the received packet, a copy of the received packet or information regarding the received packet to the CPU.

In some examples, the one or more ASICs may be configured to receive an indication that one or more additional IP hosts may be learned for the subnet. For example, one or more previously-learned IP hosts may have timed out, so that the current number of IP hosts for the subnet is no longer the maximum number of IP hosts for the subnet. According to some such examples, the one or more ASICs may be configured to receive, via the interface system 604, a packet having a destination IP address for an unlearned host on the subnet for which the corresponding MAC address is not known. In some such examples, the one or more ASICs may be configured to forward the packet, a copy of the packet or information regarding the packet to the CPU.

According to some examples, the memory system 608 may include one or more memory devices, such as one or more RAM devices, ROM devices, etc. In some implementations, the memory system 608 may include one or more computer-readable media. Computer-readable media include both computer storage media and communication media including any medium that may be enabled to transfer a computer program from one place to another. Storage media may be any available media that may be accessed by a computer. In some examples, the memory system 608 may include one or more computer readable non-transitory media. By way of example, and not limitation, computer readable non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

FIG. 7 is a schematic representation of a network device (e.g., switch, router, etc.) that can be adapted in accordance with the present disclosure. FIG. 7 is an example of the apparatus 601 of FIG. 6. In some embodiments, network device 700 can include a management module 702, an internal fabric module 704, and a number of I/O modules 706*a*-706*p*. Management module 702 can constitute the control plane (also referred to as control layer or simply the CPU) of network device 700 and can include one or more management CPUs 708 for managing and controlling operation of network device 700 in accordance with the present disclosure. Each management CPU 708 can be a general-purpose processor, such as an Intel®/AMD® x86, ARM® microprocessor and the like, which operates under the control of software stored in a memory, such as ROM (read-only memory) 724 or RAM (random-access memory) 726. The control plane provides services that include traffic management functions such as routing, security, load balancing, analysis, and the like. In some examples, one or more management CPUs 708 may be configured to perform some or all of the methods disclosed herein, for example according to software stored in the ROM 724 and/or the RAM 726.

Management module 702 includes one or more management CPUs 708 that communicate with storage subsystem 720 via bus subsystem 730. Other subsystems, such as a network interface subsystem (not shown in FIG. 7), may be on bus subsystem 730. Storage subsystem 720 can include memory subsystem 722 and non-volatile storage subsystem 728. Storage subsystem 720 represents an example of non-transitory computer-readable storage media that can store program code and/or data, which when executed by one or more management CPUs 708, can cause one or more management CPUs 708 to perform operations in accordance with embodiments of the present disclosure. The connections between the management module 702 and the I/O modules 706a and 706p are control plane connections.

Memory subsystem 722 can include a number of memories including RAM 726 for storage of instructions and data during program execution and ROM (read-only memory) 724 in which fixed instructions and data are stored. Storage subsystem 728 can provide persistent (i.e., non-volatile) storage for program and data files, and can include various types of storage media known in the art such as solid-state drives, hard-disk drives, and so on.

One or more management CPUs 708 can run a network operating system stored in storage subsystem 720. A network operating system is a specialized operating system for network device 700 (e.g., a router, switch, firewall, and the like). For example, the network operating system may be Arista Extensible Operating System (EOS®), which is a fully programmable and highly modular, Linux-based network operating system. Other network operating systems may be used.

Bus subsystem 730 can provide a mechanism for letting the various components and subsystems of management module 702 communicate with each other as intended. Although bus subsystem 730 is shown schematically as a single bus, alternative embodiments of the bus subsystem can utilize multiple buses.

Internal fabric module 704 and I/O modules 706a-706p collectively represent the data plane of network device 700 (also referred to as data layer, forwarding plane, etc.). Accordingly, the connections between the internal fabric module 704 and the I/O modules 706a and 706p are data plane connections. Internal fabric module 704 represents interconnections among the various other modules of network device 700. Each I/O module 706a-706p can include one or more input/output (ingress/egress) ports 710a-710p that are used by network device 700 to receive and forward network traffic. Each I/O module 706a-706p can also include packet processing capability, logically represented by respective packet processors 712a-712p and memory components 714a-714p. Packet processors 712a-712p can comprise forwarding hardware, including for example, data processing elements such as an ASIC (application specific integrated circuit), FPGA (field programmable array), digital processing unit, and the like. Memory components 714a-714p can include lookup hardware, including for example, content addressable memory such as TCAMs (ternary CAMs) and auxiliary memory such as SRAMs (static random access memory). The forwarding hardware in conjunction with the lookup hardware can provide wire speed decisions on how to process ingress packets and outgoing packets for egress. In accordance with some embodiments, some aspects of the present disclosure may be performed within the data plane.

Various modifications to the implementations described in this disclosure may be readily apparent to those having ordinary skill in the art. The disclosed examples may be applied to other implementations without departing from the scope of this disclosure. Accordingly, this disclosure is not intended to be limited to the implementations shown and described herein, but is to be accorded the widest scope consistent with the claims, the principles and the novel features disclosed herein. One of ordinary skill in the art will appreciate that the above description and the accompanying drawings have been presented only by way of example and that modifications in detail may be made within the scope of this disclosure.

What is claimed is:

1. A network device comprising:
a central processing unit (CPU);
an interface system including one or more network interfaces configured for sending and receiving packets from other devices via a network; and
one or more application-specific integrated circuits (ASICs) configured for packet forwarding, each of the one or more ASICs configured to:
    receive an indication that a maximum number of learned Internet Protocol (IP) hosts for a subnet that includes the network device has been reached, a learned IP host being an IP host for which a corresponding media access control (MAC) address is known;
    receive, via the interface system and in a time interval during which the maximum number of learned IP hosts for the subnet has been reached, a packet having a destination IP address for an unlearned host on the subnet for which a corresponding MAC address is not known, wherein the MAC address corresponding to the destination IP address for the unlearned host is not known based on an Address Resolution Protocol (ARP) cache lacking a binding of the destination IP address and the corresponding MAC address for the unlearned host; and
    drop the received packet.

2. The network device of claim 1, wherein the indication is received from the CPU.

3. The network device of claim 1, wherein the maximum number of learned IP hosts is specific to an IP version.

4. The network device of claim 3, wherein the IP version is IP version 4 or IP version 6.

5. The network device of claim 1, wherein each of the one or more ASICs is configured to drop the received packet without sending the received packet to the CPU.

6. The network device of claim 1, wherein each of the one or more ASICs is configured to drop the received packet without sending information regarding the received packet to the CPU.

7. The network device of claim 1, wherein each of the one or more ASICs is further configured to:
receive an indication that one or more IP hosts have been unlearned for the subnet;
receive, via the interface system, an additional packet having the destination IP address for the unlearned host on the subnet for which the corresponding MAC address is not known; and
forward the additional packet to the CPU.

8. A method, comprising:
receiving, by an application-specific integrated circuit (ASIC), an indication that a maximum number of learned Internet Protocol (IP) hosts for a subnet has been reached, a learned IP host being an IP host for which a corresponding media access control (MAC) address is known;

receiving, by the ASIC and in a time interval during which the maximum number of learned IP hosts for the subnet has been reached, a packet having a destination IP address for an unlearned host on the subnet for which a corresponding MAC address is not known, wherein the MAC address corresponding to the destination IP address for the unlearned host is not known based on an Address Resolution Protocol (ARP) cache lacking a binding of the destination IP address and the corresponding MAC address for the unlearned host, the ARP cache having bindings of destination IP addresses and corresponding MAC addresses updated based on ARP responses; and dropping, by the ASIC, the received packet.

9. The method of claim 8, wherein the indication is received from a CPU of an apparatus included in the subnet and wherein the apparatus includes the ASIC.

10. The method of claim 9, further comprising dropping, by the ASIC, the received packet without sending the received packet to the CPU.

11. The method of claim 9, further comprising dropping, by the ASIC, the received packet without sending information regarding the received packet to the CPU.

12. The method of claim 9, further comprising:

receiving, by the ASIC, an indication that one or more IP hosts have been unlearned for the subnet;

receiving, by the ASIC, an additional packet having the destination IP address for the unlearned host on the subnet for which the corresponding MAC address is not known; and forwarding, by the ASIC, the additional packet to the CPU.

13. The method of claim 8, wherein the maximum number of learned IP hosts is specific to an IP version.

14. The method of claim 13, wherein the IP version is IP version 4 or IP version 6.

15. One or more non-transitory computer-readable media having instructions for performing a method encoded thereon, the method comprising:

receiving, by an application-specific integrated circuit (ASIC), an indication that a maximum number of learned Internet Protocol (IP) hosts for a subnet has been reached, a learned IP host being an IP host for which a corresponding media access control (MAC) address is known;

receiving, by the ASIC and in a time interval during which the maximum number of learned IP hosts for the subnet has been reached, a packet having a destination IP address for an unlearned host on the subnet for which a corresponding MAC address is not known, wherein the MAC address corresponding to the destination IP address for the unlearned host is not known based on an Address Resolution Protocol (ARP) cache lacking a binding of the destination IP address and the corresponding MAC address for the unlearned host, the binding having been deleted from the ARP cache pursuant to a time-out process; and dropping, by the ASIC, the received packet.

16. The one or more non-transitory computer-readable media of claim 15, wherein the indication is received from a CPU of an apparatus included in the subnet and wherein the apparatus includes the ASIC.

17. The one or more non-transitory computer-readable media of claim 16, wherein the method further comprises dropping, by the ASIC, the received packet without sending the received packet to the CPU.

18. The one or more non-transitory computer-readable media of claim 16, wherein the method further comprises dropping, by the ASIC, the received packet without sending information regarding the received packet to the CPU.

19. The one or more non-transitory computer-readable media of claim 15, wherein the method further comprises:

receiving, by the ASIC, an indication that one or more learned IP hosts have been unlearned for the subnet;

receiving, by the ASIC, an additional packet having the destination IP address for the unlearned host on the subnet for which the corresponding MAC address is not known; and forwarding, by the ASIC, the additional packet to the CPU.

20. The one or more non-transitory computer-readable media of claim 15, wherein the maximum number of learned IP hosts is specific to an IP version.

* * * * *